United States Patent
Sheedy et al.

(10) Patent No.: US 9,908,820 B2
(45) Date of Patent: Mar. 6, 2018

(54) SYSTEMS AND METHODS FOR CERAMIC MATRIX COMPOSITES

(71) Applicant: United Technologies Corporation, Hartford, CT (US)

(72) Inventors: Paul Sheedy, Bolton, CT (US); David C. Jarmon, Kensington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 73 days.

(21) Appl. No.: 14/838,856

(22) Filed: Aug. 28, 2015

(65) Prior Publication Data

US 2016/0068446 A1    Mar. 10, 2016

Related U.S. Application Data

(60) Provisional application No. 62/046,368, filed on Sep. 5, 2014.

(51) Int. Cl.
| | |
|---|---|
| *C04B 35/82* | (2006.01) |
| *C04B 35/76* | (2006.01) |
| *C04B 35/80* | (2006.01) |
| *C04B 35/14* | (2006.01) |
| *C04B 35/83* | (2006.01) |

(52) U.S. Cl.
CPC .............. *C04B 35/82* (2013.01); *C04B 35/14* (2013.01); *C04B 35/76* (2013.01); *C04B 35/80* (2013.01); *C04B 35/83* (2013.01); *C04B 2235/3418* (2013.01); *C04B 2235/421* (2013.01); *C04B 2235/5284* (2013.01); *C04B 2235/5288* (2013.01); *C04B 2235/606* (2013.01)

(58) Field of Classification Search
CPC ......... C04B 35/76; C04B 35/80; C04B 35/82; C04B 35/83; C04B 35/14; C04B 2235/5288; C04B 2235/5284
See application file for complete search history.

(56) References Cited

U.S. PATENT DOCUMENTS

| | | | |
|---|---|---|---|
| 4,902,326 A | 2/1990 | Jarmon | |
| 8,286,689 B1 * | 10/2012 | Bochiechio | B22C 7/00 164/28 |

(Continued)

FOREIGN PATENT DOCUMENTS

| | | |
|---|---|---|
| CN | 103951455 | 7/2014 |
| FR | 2981643 | 4/2013 |

OTHER PUBLICATIONS

Extended European Search Report dated Feb. 16, 2016 in European Application No. 15183560.0.

(Continued)

*Primary Examiner* — Nahida Sultana
(74) *Attorney, Agent, or Firm* — Snell & Wilmer, L.L.P.

(57) ABSTRACT

Methods for fabricating a ceramic matrix composite are disclosed. A fiber preform may be placed in a mold. An aqueous solution may be added to the fiber preform. The aqueous solution may include water, carbon nanotubes, and a binder. The preform may be frozen. Freezing the preform may cause the water to expand and separate fibers in the fiber preform. The carbon nanotubes may bond to the fibers. The preform may be freeze dried to remove the water. The preform may then be processed according to standard CMC process.

13 Claims, 6 Drawing Sheets

(56) References Cited

U.S. PATENT DOCUMENTS

| | | | |
|---|---|---|---|
| 2002/0149128 A1* | 10/2002 | DiChiara, Jr. | B28B 1/52 264/44 |
| 2005/0176329 A1* | 8/2005 | Olry | B82Y 30/00 442/388 |
| 2006/0116284 A1* | 6/2006 | Pak | B01J 21/185 502/180 |
| 2007/0107395 A1* | 5/2007 | Zuberi | B01D 39/2086 55/523 |
| 2007/0111878 A1* | 5/2007 | Zuberi | B01D 39/2086 501/95.1 |
| 2008/0179782 A1* | 7/2008 | Liu | B01D 39/2089 264/211 |
| 2009/0176112 A1* | 7/2009 | Kruckenberg | B82Y 30/00 428/457 |
| 2011/0124483 A1* | 5/2011 | Shah | B82Y 30/00 501/32 |
| 2012/0196146 A1* | 8/2012 | Rice | C04B 35/117 428/613 |
| 2013/0048903 A1* | 2/2013 | Garnier | B01J 27/22 252/71 |
| 2013/0171441 A1* | 7/2013 | Hecht | C08K 7/22 428/293.7 |
| 2014/0226317 A1* | 8/2014 | Livesay | H01L 33/641 362/147 |
| 2014/0287641 A1* | 9/2014 | Steiner | B32B 5/26 442/223 |
| 2014/0349117 A1* | 11/2014 | Sastri | C04B 35/581 428/408 |
| 2015/0033937 A1* | 2/2015 | Lashmore | C01B 21/0641 89/36.02 |
| 2015/0376064 A1* | 12/2015 | Chung | C04B 33/326 501/100 |
| 2016/0083253 A1* | 3/2016 | Kim | C01B 21/064 252/183.14 |
| 2016/0122252 A1* | 5/2016 | Garnier | B01J 27/22 252/71 |
| 2016/0380090 A1* | 12/2016 | Roberts | H01L 22/32 257/76 |

OTHER PUBLICATIONS

Kalay, et al., "Synthesis of boron nitride nanotubes and their applications," Beilstein Journal of Nanotechnology, 2015, vol. 6, pp. 84-102.

\* cited by examiner

SYSTEMS AND METHODS FOR CERAMIC MATRIX COMPOSITES

CROSS-REFERENCE TO RELATED APPLICATIONS

This application is a nonprovisional of, and claims priority to, and the benefit of U.S. Provisional Application No. 62/046,368, entitled "SYSTEMS AND METHODS FOR CERAMIC MATRIX COMPOSITES," filed on Sep. 5, 2014, which is hereby incorporated by reference in its entirety.

FIELD

The disclosure relates generally to composite materials, and more specifically to methods for forming ceramic matrix composites.

BACKGROUND

Fiber-reinforced ceramic matrix composites ("CMCs") can exhibit exceptional high temperature properties such as high strength, modulus, and toughness. These properties result from the incorporation of high strength fibers into a stable matrix. The high strength fibers may have a coating which creates a weak interface between the fibers and the matrix material. The fibers are typically incorporated into the composite in fiber tows, which are bundles of individual fiber filaments. Each fiber tow may remain as a discrete entity during CMC processing as opposed to having the individual fiber filaments being distributed uniformly throughout the composite.

The weak interface between the fibers and the matrix material enables debonding of the fibers from the matrix, allowing for crack deflection, bridging and enhanced material strength and toughness.

SUMMARY

A method for fabricating a composite material may comprise adding a slurry to a fiber preform comprising a plurality of fiber tows. The slurry may be intermixed with carbon nanotubes. The method may comprise freezing the fiber preform. The method may comprise freeze drying the fiber preform.

In various embodiments, the freezing the fiber preform may separate fibers in the plurality of fiber tows. The slurry may comprise a binder. The method may comprise heat treating the fiber preform. The heat treating may comprise converting the carbon nanotubes to at least one of boron carbide or boron nitride nanotubes. The heat treating may comprise converting the carbon nanotubes to silicon carbide nanotubes. The carbon nanotubes may bond to fibers in the fiber tows. The method may comprise processing the fiber preform via at least one of slurry casting, chemical vapor infiltration, polymer infiltration and pyrolysis, or melt infiltration.

A method of manufacturing an aircraft component may comprise inserting a fiber tow in a mold. An aqueous solution comprising water, carbon nanotubes, and a binder may be introduced into the mold. The aqueous solution may be frozen. Freezing the aqueous solution may separate fibers within the fiber tow. The aqueous solution may be freeze dried. The freeze drying may remove the water from the mold. The mold may be processed via at least one of slurry cast, chemical vapor infiltration, polymer infiltration and pyrolysis, or melt infiltration.

In various embodiments, the carbon nanotubes may form an interfacial region surrounding the fibers. The method may further comprise converting the carbon nanotubes to at least one of boron carbide or boron nitride nanotubes. The method may further comprise converting the carbon nanotubes to silicon carbide nanotubes. The freezing may comprise at least one of inserting the mold in a freezer, cooling the mold with liquid nitrogen, or cooling the mold with dry ice. The carbon nanotubes and the fiber tow may form a rigid preform. The method may further comprise pyrolyzing the binder to carbon and converting the carbon to at least one of silicon carbide or boron carbide.

A ceramic matrix composite may be formed by a process comprising inserting a fiber tow in a mold. An aqueous solution comprising water, carbon nanotubes, and a binder may be introduced into the mold. The aqueous solution may be frozen. Freezing the aqueous solution may separate fibers within the fiber tow. The aqueous solution may be freeze dried. The freeze drying may remove the water from the mold. The mold may be processed via at least one of slurry cast, chemical vapor infiltration, polymer infiltration and pyrolysis, or melt infiltration.

In various embodiments, the process may comprise converting the carbon nanotubes to at least one of boron carbide or boron nitride nanotubes. The process may further comprise converting the carbon nanotubes to silicon carbide nanotubes. The carbon nanotubes may be bonded to the fibers. The carbon nanotubes may form an interfacial region surrounding the fibers.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Methods for forming ceramic matrix composites ("CMCs") with enhanced fiber distribution are disclosed herein. The CMCs may comprise increased uniformity of fiber distribution throughout the CMC. A fiber preform may be provided. The fiber preform may comprise a plurality of fiber tows. An aqueous solution may be introduced into the fiber preform. The aqueous solution may be intermixed with carbon nanotubes. The aqueous solution may freeze, spreading apart the individual fibers in the fiber tows by virtue of expansion associated with freezing. The water in the aqueous solution may be removed via a freeze drying process. After the removal of water, the carbon nanotubes may remain in place. The carbon nanotubes may be converted to boron carbide, boron nitride, or silicon carbide nanotubes via heat treatment in the presence of a precursor, such as a boron-bearing precursor. Standard CMC processing methods may be used to finish the CMC fabrication.

Figure 1:
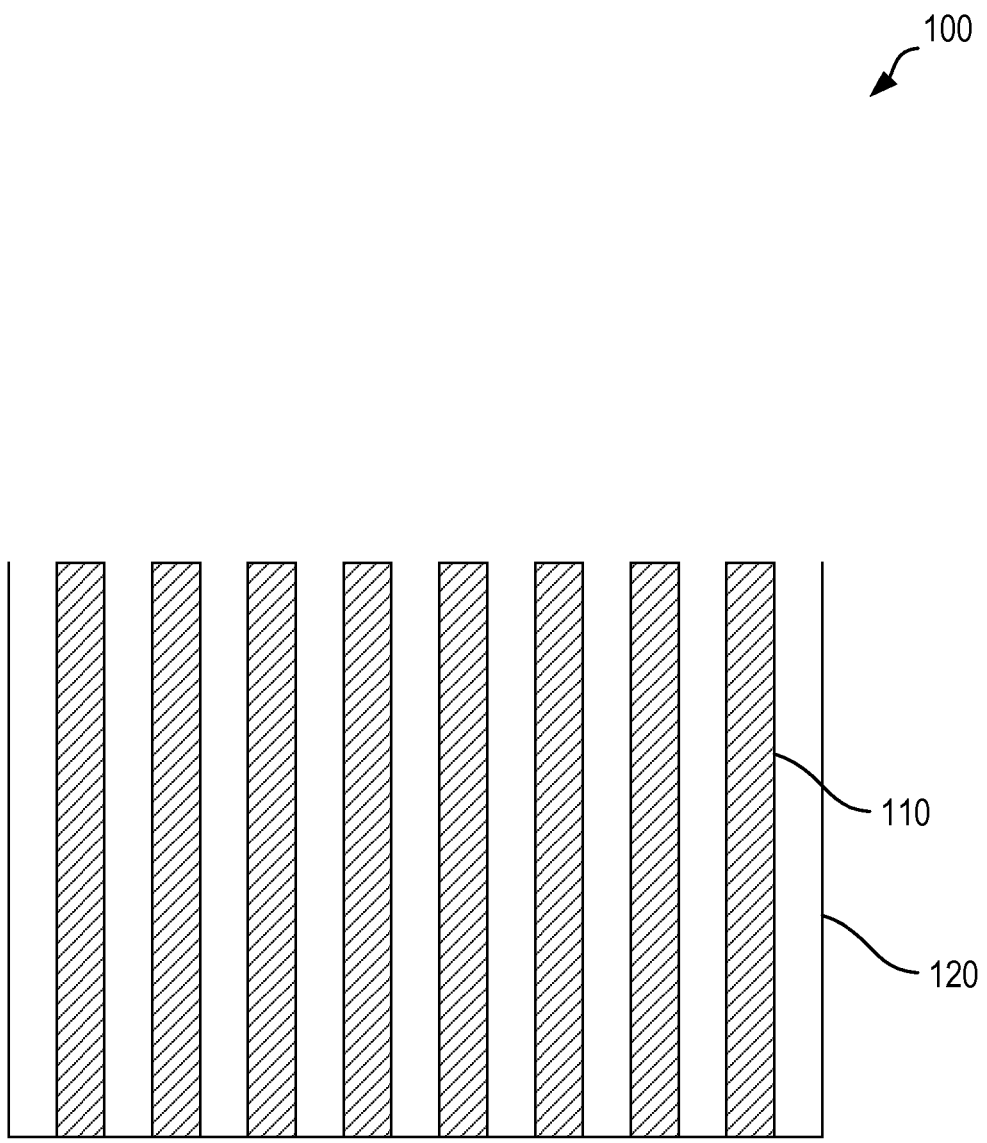
FIG. 1 illustrates a fiber preform in accordance with various embodiments.

Referring to FIG. 1, a fiber preform 100 is illustrated according to various embodiments. A plurality of fiber tows 110 may be placed in a mold 120. In various embodiments, the fiber tows 110 may be aligned in a tape, and layers of tape may be stacked in order to fill the mold 120. Each fiber tow 110 may comprise a plurality of individual fibers. The fibers may comprise any material typically used in CMC processing, such as polyacrylonitrile ("PAN") fibers, carbon, alumina, silicon carbide, zirconia, boron carbide, glass, or mullite. In various embodiments, the fibers may comprise a weak interface coating, which allows the fibers to slide with respect to a matrix material. However, in various embodiments the fibers may be bare fibers, wherein the fibers do not comprise a weak interface coating or any interface coating.

Figure 2:
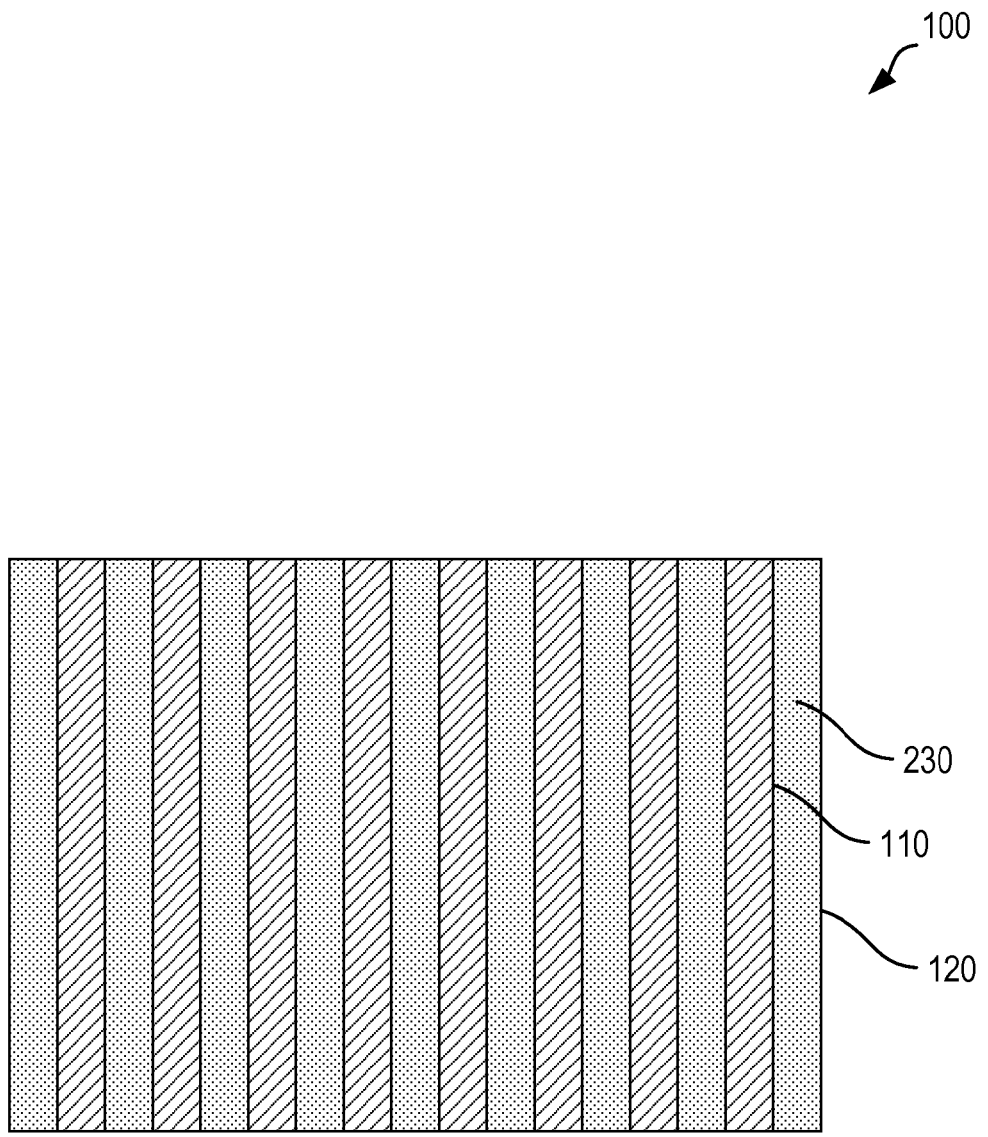
FIG. 2 illustrates a fiber preform in a slurry in accordance with various embodiments.

Referring to FIG. 2, the fiber preform 100 is illustrated with a slurry 230 introduced to the mold 120 and surrounding fiber tows 110. The slurry may comprise an aqueous solution comprising water, carbon nanotubes, binders, or any other suitable organic or inorganic additives. Binders may include polyvinyl alcohol ("PVA"), polyvinylpyrrolidone ("PVP"), polyethylenimine ("PEI"), cellulosic binders, phenolic resins, acrylics, or any other suitable binders.

Figure 3:
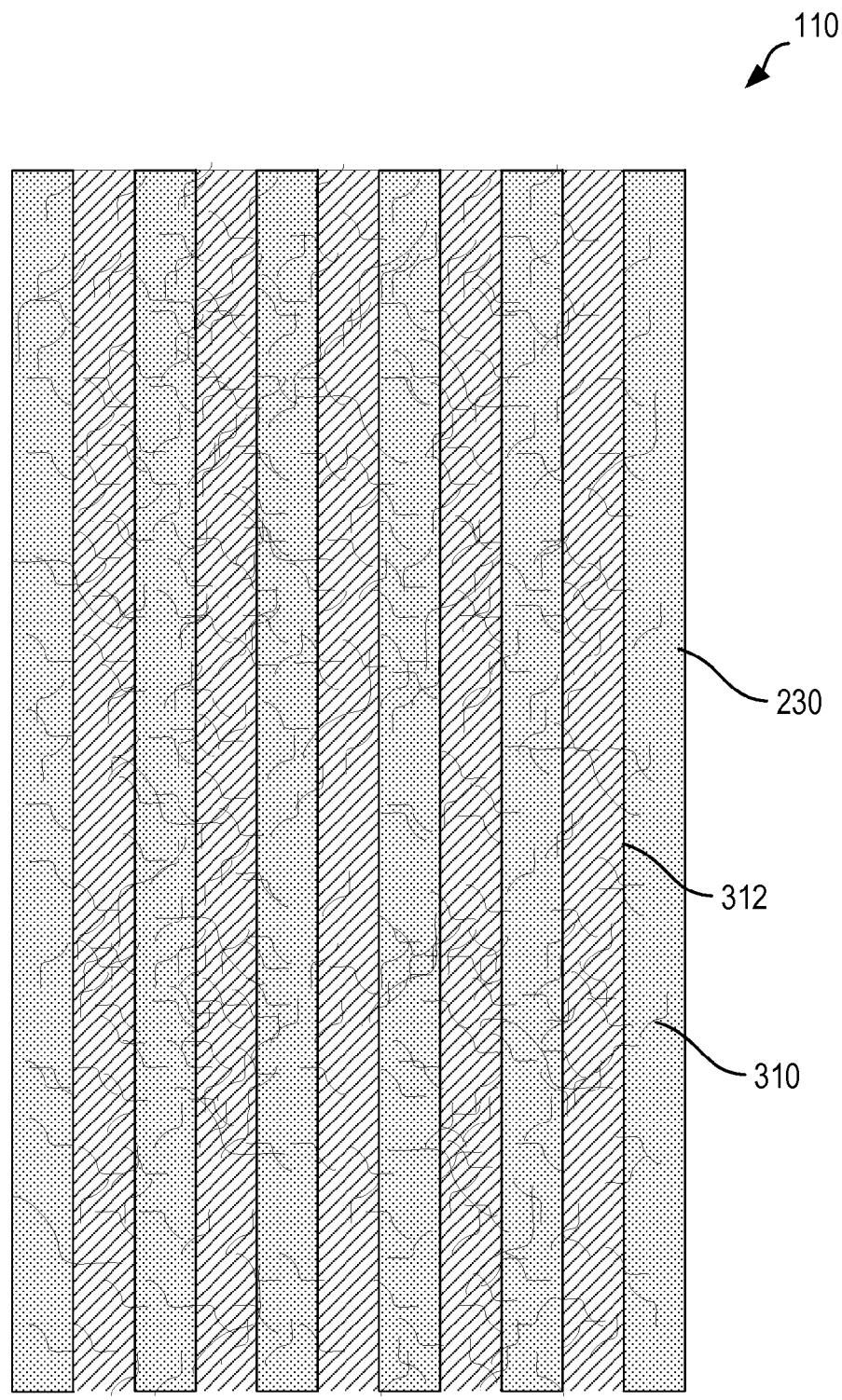
FIG. 3 illustrates a fiber tow in a slurry in accordance with various embodiments.

Referring to FIG. 3, an enlarged view of a fiber tow 110 in the slurry 230 is illustrated according to various embodiments. The carbon nanotubes 310 in the slurry 230 may be distributed throughout the slurry and between the individual fibers 312 in the fiber tow 110. The binders in the slurry may bond the carbon nanotubes 310 to the fibers 312. The fiber preform may be frozen, and the slurry 230 and carbon nanotubes 310 may freeze in place. The fiber preform may be frozen by a variety of methods, including being placed in a freezer, or being chilled by liquid nitrogen or dry ice.

Figure 4:
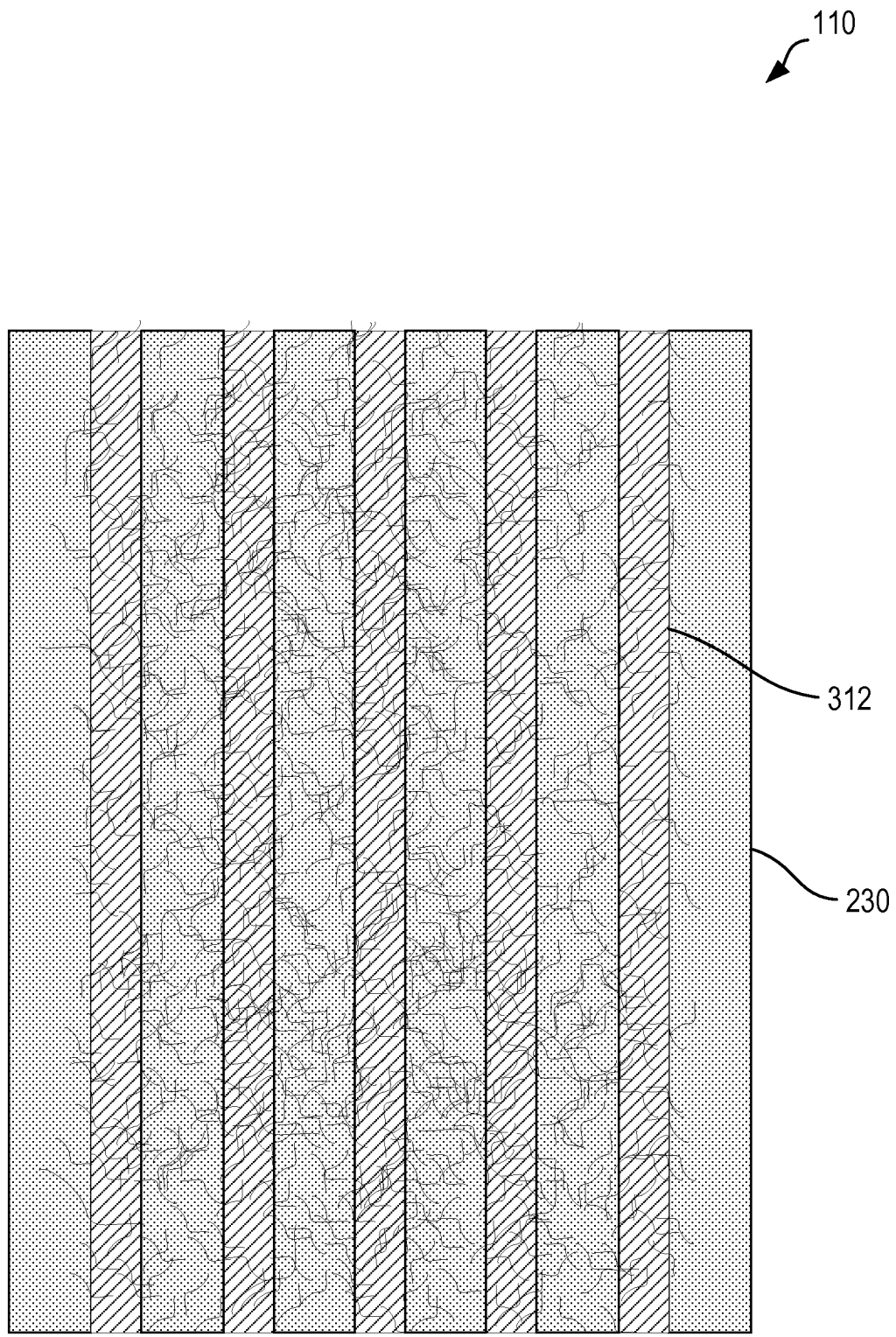
FIG. 4 illustrates a fiber tow in a frozen slurry in accordance with various embodiments.

Referring to FIG. 4, an enlarged view of a fiber tow 110 in the frozen slurry 230 is illustrated according to various embodiments. During the freezing process, the water in the slurry 230 may expand. This expansion may spread apart the individual fibers 312. The spreading of the fibers 312 may more uniformly distribute the fibers 312 throughout the mold. This may improve the properties of the final component, as the fibers 312 will provide strength more uniformly throughout the composite, as opposed to having regions in between tows comprising primarily matrix material. The mold may be freeze dried in order to remove the water from the mold.

Figure 5:
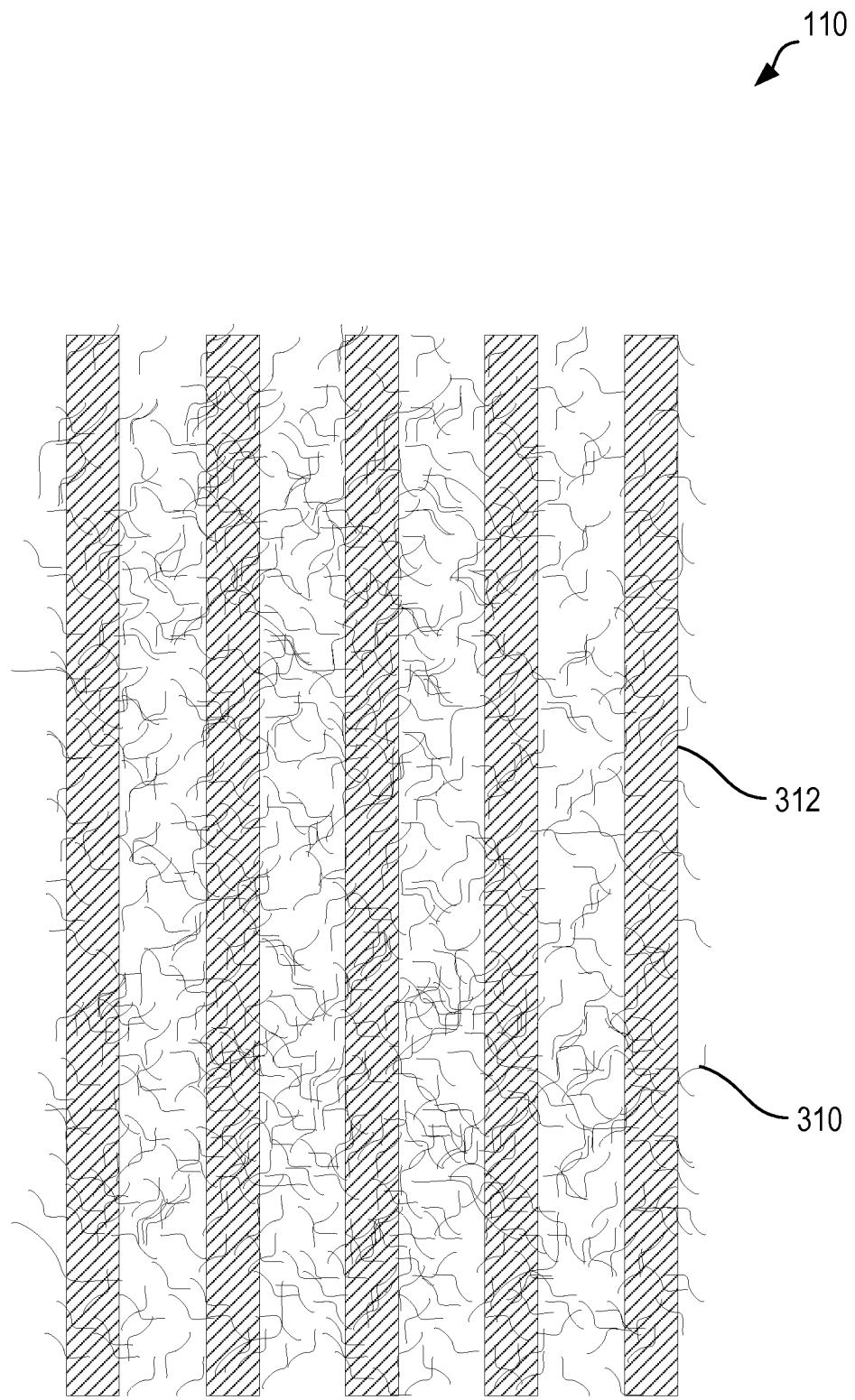
FIG. 5 illustrates a freeze dried fiber tow in accordance with various embodiments.

Referring to FIG. 5, an enlarged view of a fiber tow 110 after freeze drying is illustrated according to various embodiments. The freeze drying may remove the water. However, the carbon nanotubes 310 may remain coupled to the fibers 312. The carbon nanotubes 310 may form an entangled network of nanotubes throughout the fiber tow 110. The carbon nanotubes 310 may form a rigid structure which prevents the fibers 312 from moving back together. The carbon nanotubes 310 and fiber tows 110 may form a rigidized preform. Additionally, as the carbon nanotubes 310 are distributed in multiple orientations, the carbon nanotubes 310 may provide multi-directional strength to the final composite structure.

In various embodiments, the fibers may comprise an interface coating. A rigidized preform may be processed via standard CMC processing methods, such as a slurry cast method, chemical vapor infiltration, melt infiltration, polymer infiltration and pyrolysis, or combinations thereof, with the carbon nanotubes 310 providing and enhanced interfacial region.

However, in various embodiments, the carbon nanotubes 310 may be further processed to create an interfacial zone surrounding the fibers 312 which creates a weak bond with the matrix material. The rigidized preform may be heated to a temperature of between 1230° C.-1800° C. (2240° F.-3300° F.) under vacuum or inert atmosphere in a furnace containing a silicon oxide bearing precursor. The carbon nanotubes 310 may react with the silicon oxide bearing precursor and be converted to silicon carbide nanotubes.

In various embodiments, the rigidized preform may be heated to a temperature of between 1300° C.-1800° C. (2400° F.-3300° F.) in the presence of a boron-bearing precursor under a nitrogen-containing or combined vacuum and nitrogen-containing atmosphere. The carbon nanotubes 310 may be converted to boron carbide, silicon carbide, or boron nitride nanotubes. In either heat treating process, the organic or inorganic binders or additives may be converted to a more desirable composition. For example, the organic binders may be pyrolzyed to carbon and converted to silicon carbide or boron carbide. After the heat treatment, the rigidized preform may be processed using standard CMC processes.

Figure 6:
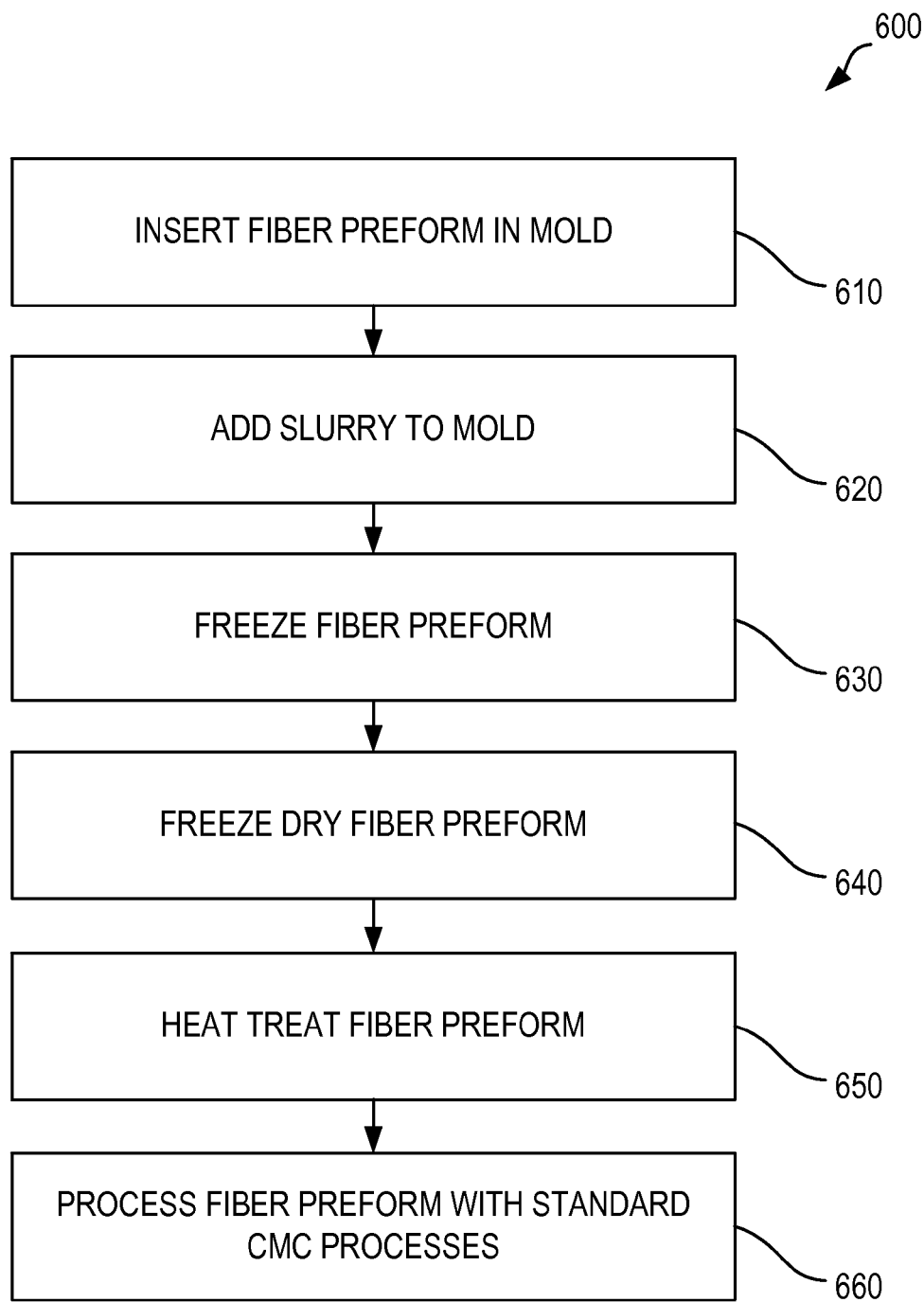
FIG. 6 illustrates a flowchart of a process for fabricating a ceramic matrix composite in accordance with various embodiments.

Referring to FIG. 6, a flowchart of a process 600 for fabricating a CMC is illustrated according to various embodiments. A fiber preform comprising a plurality of fiber tows may be inserted in a mold (step 610). A slurry comprising an aqueous solution and carbon nanotubes may be inserted in the mold (step 620). The fiber preform may be frozen (step 630). Freezing the fiber preform may spread apart the individual fibers in the fiber tows. The fiber preform may be freeze dried (step 640). Freeze drying the fiber preform may remove the liquid from the fiber preform. The carbon nanotubes may be fixed in place and coupled to the individual fibers. The fiber preform may be heat treated in the presence of a boron-bearing precursor or a silicon oxide bearing precursor (step 650). In various embodiments, the carbon nanotubes may be converted to boron carbide, silicon carbide or boron nitride nanotubes. In various embodiments, the carbon nanotubes may be converted to silicon carbide nanotubes. The rigidized preform may be processed according to standard CMC processes to form the CMC (step 660). In various embodiments, standard CMC processes may include at least one of slurry casting, chemical vapor infiltration, polymer infiltration and pyrolysis, or melt infiltration.

The CMCs described herein may be particularly well-suited to high temperature applications. For example, a CMC component may be used in an aircraft, such as for a turbine blade, a turbine vane, a blade outer air seal, a combustor liner, or a brake disk.

Although primarily described with reference to CMCs, the processes and products disclosed herein are also compatible with organic matrix composites ("OMCs"). Carbon nanotubes and other nanofibers may benefit the out-of-plane properties of OMCs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for fabricating a composite material comprising:
   adding a slurry to a fiber preform comprising a plurality of fiber tows, wherein the slurry is intermixed with carbon nanotubes;
   freezing the fiber preform;
   freeze drying the fiber preform; and
   heat treating the fiber preform in the presence of a boron-bearing precursor and nitrogen gas to produce boron nitride nanotubes.

2. The method of claim 1, wherein the freezing the fiber preform separates fibers in the plurality of fiber tows.

3. The method of claim 1, wherein the slurry further comprises a binder.

4. The method of claim 1, wherein the carbon nanotubes bond to fibers in the plurality of fiber tows.

5. The method of claim 1, further comprising processing the fiber preform via at least one of slurry casting, chemical vapor infiltration, polymer infiltration and pyrolysis, or melt infiltration.

6. A method of manufacturing an aircraft component comprising:
   inserting a fiber tow into a mold;
   introducing an aqueous solution comprising water, carbon nanotubes, and a binder into the mold;
   freezing the aqueous solution, wherein the freezing the aqueous solution separates fibers within the fiber tow;
   freeze drying the aqueous solution, wherein the freeze drying removes at least a portion of the water from the mold;
   processing the mold via at least one of slurry casting, chemical vapor infiltration, polymer infiltration and pyrolysis, or melt infiltration; and
   heat treating the fiber tow in the presence of a boron-bearing precursor and nitrogen gas to produce boron nitride nanotubes.

7. The method of claim 6, wherein the carbon nanotubes form an interfacial region surrounding the fibers.

8. The method of claim 6, wherein the freezing comprises at least one of inserting the mold in a freezer, cooling the mold with liquid nitrogen, or cooling the mold with dry ice.

9. The method of claim 6, wherein the carbon nanotubes and the fiber tow form a rigid preform.

10. The method of claim 1, wherein the boron-bearing precursor is boron oxide.

11. The method of claim 10, wherein the heat treating the fiber preform proceeds through the reaction $B_2O_3 + 3C(CNTs) + N_2 \rightarrow 2BN(BNNTs) + 3CO$, wherein CNTs represent carbon nanotubes, and BNNTs represent boron nitride nanotubes.

12. The method of claim 6, wherein the boron-bearing precursor is boron oxide.

13. The method of claim 12, wherein the heat treating the fiber preform proceeds through the reaction $B_2O_3 + 3C$ (CNTs)+$N_2$→2BN(BNNTs)+3CO, wherein CNTs represent carbon nanotubes, and BNNTs represent boron nitride nanotubes.

* * * * *